United States Patent
Mani et al.

(10) Patent No.: US 10,009,478 B2
(45) Date of Patent: Jun. 26, 2018

(54) NEAREND SPEECH DETECTOR

(71) Applicant: Imagination Technologies Limited, Kings Langley (GB)

(72) Inventors: Senthil Kumar Mani, Hyderabad (IN); Gandhi Namani, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 0 days. days.

(21) Appl. No.: 15/250,329

(22) Filed: Aug. 29, 2016

(65) Prior Publication Data

US 2017/0064087 A1    Mar. 2, 2017

(30) Foreign Application Priority Data

Aug. 27, 2015  (GB) .................................. 1515267.1

(51) Int. Cl.
| | |
|---|---|
| *H04M 9/08* | (2006.01) |
| *G10L 21/0208* | (2013.01) |
| *G10L 25/84* | (2013.01) |
| *G10L 25/21* | (2013.01) |
| *H04M 7/00* | (2006.01) |
| *G10L 21/0232* | (2013.01) |

(52) U.S. Cl.
CPC ......... *H04M 9/085* (2013.01); *G10L 21/0208* (2013.01); *G10L 25/21* (2013.01); *G10L 25/84* (2013.01); *H04M 7/0024* (2013.01); *H04M 9/082* (2013.01); *G10L 21/0232* (2013.01); *G10L 2021/02082* (2013.01)

(58) Field of Classification Search
CPC .......... H04M 9/082; H04B 3/23; H04B 3/234
USPC ...... 381/406.14, 406.04; 379/406.14, 406.04
See application file for complete search history.

(56) References Cited

U.S. PATENT DOCUMENTS

| | | | |
|---|---|---|---|
| 6,144,937 A * | 11/2000 | Ali ...................... | G10L 21/0208 704/226 |
| 6,434,110 B1 * | 8/2002 | Hemkumar ........... | H04M 9/082 370/201 |
| 2002/0054685 A1 * | 5/2002 | Avendano ............. | H04M 9/082 381/66 |

(Continued)

OTHER PUBLICATIONS

Onur et al. "Adaptive echo and noise cancellation for car handsfree voice communication", IEEE Xplore Abstract, Apr. 24-26, 2013.

(Continued)

*Primary Examiner* — Alexander Jamal
(74) *Attorney, Agent, or Firm* — Vorys, Sater, Seymour and Pease LLP; Vincent M DeLuca

(57) ABSTRACT

A nearend speech detector for classifying speech at a communication system receiving a microphone signal from a nearend microphone and a farend signal from a farend communication system, the nearend speech detector comprising: a signal processor configured to transform the microphone and farend signals into the frequency domain; a calculation unit configured to form: an estimate of a nearend signal representing nearend speech present in the microphone signal; and a measure of gain between the microphone signal and the nearend signal; and a signal classifier configured to classify speech at the communication system in dependence on a measure of variance of the gain and a measure of variance of the nearend signal.

19 Claims, 7 Drawing Sheets

(56) References Cited

U.S. PATENT DOCUMENTS

| | | | |
|---|---|---|---|
| 2008/0198909 A1* | 8/2008 | Tsatsanis | H04B 3/32 375/219 |
| 2008/0240415 A1 | 10/2008 | Mohammad et al. | |
| 2009/0036170 A1 | 2/2009 | Takahiro et al. | |
| 2010/0316228 A1* | 12/2010 | Baran | H04M 9/082 381/66 |
| 2011/0176687 A1* | 7/2011 | Birkenes | H04M 9/085 381/66 |
| 2013/0163698 A1 | 6/2013 | Volcker et al. | |
| 2014/0064476 A1 | 3/2014 | Mani et al. | |
| 2014/0112488 A1 | 4/2014 | Woo et al. | |

OTHER PUBLICATIONS

Qi "Echo canceller with both doubletalk detector and path change detector" IEEE Xplore Abstract, Mar. 3-5, 2012.

"Series P: Telephone Transmission Quality, Telephone Installations, Local Line Networks" May 2000.

"Series P: Terminals and Subjective and Objective Assessment Methods" Jan. 2012.

Hamidia et al. "A New Structure for Acoustic Echo Cancellation in Double-Talk Scenario Using Auxiliary Filter" 2014 14th International Workshop on Acoustic Signal Enhancement (IWAENC) 2014 IEEE pp. 253-257.

Das et al. "A New Cross Correlation Based Double Talk Detection Algorithm for Nonlinear Acoustic Echo Cancellation" 2014 IEEE.

Chao et al. "Improved Nonlinear Residual Echo Suppression based on Partial Echo Path Modeling DTD" 2013 IEEE.

Duttweiler et al "A Twelve-Channel Digital Echo Canceler" IEEE Transactions on Communications, vol. COM-26, No. 5, May 1978, pp. 647-653.

Ye et al "A New Double-Talk Detection Algorithm Based on the Orthogonality Theorem" IEEE Transactions on Communications, vol. 39, No. 11, Nov. 199, pp. 1542-1545.

Bensesty et al. "A New Class of Doubletalk Detectors Based on Cross-Correlation" IEEE Transactions on Speech and Audio Processing, vol. 8, No. 2, Mar. 2000, pp. 168-172.

Schueldt et al. "A Delay-Based Double-Talk Detector" IEEE Transactions on Speech and Audio Processing, vol. 20, No. 6, Aug. 2012, pp. 1725-1733.

Gaensler et al "A Double-Talk Detector Based on Coherence" IEEE Transactions on Communications, vol. 44, No. 11, November 1996, pp. 1421-1427.

Tashev "Coherence Based Double Talk Detector With Soft Decision" 2012 IEEE, pp. 165-168.

Sakai et al. "The Performance of the Acoustic Echo Cancelation Using Blind Source Separation to Reduce Double-Talk Interference" 2013 IEEE, pp. 61-66.

Sakai et al. "The Acoustic Echo Cancelation Using Blind Source Separation to Reduce Double-Talk Interference" 2014 14th International Workshop on Acoustic Signal Enhancement, pp. 323-326.

Ikram "Blind Source Separation and Acoustic Echo Cancellation: A Unified Framework" 2012 IEE, pp. 1701-1704.

Kanadi et al. "A Variable Step-Size-Based ICA Method for a Fast and Robust Acoustic Echo Cancellation System Without Requiring Double-Talk Detector" 2013 IEEE, pp. 118-121.

Hamidia et al. "Double-Talk Detection Using the Singular Value Decomposition for Acoustic Echo Cancellation" IEEE ICC 2013—Signal Processing for Communications Symposium, pp. 4745-4749.

Ephraim et al. "Speech Enhancement Using a-Minimum Mean-Square Error Short-Time Spectral Amplitude Estimator" IEEE Transactions on Acoustics, Speech, and Signal Processing, vol. ASSP-32, No. 6, Dec. 1984, pp. 1109-1121.

Widrow et al. "The LMS Algorithm" Prentice Hall, 1985. Part IV, Section 12.

Haykin "Least-Mean-Square Algorithm" Prentice Hall, 1996. Chapter 9.

Quatieri "Discrete-Time Speech Signal Processing" Principles and Practice. Pearson Education India, 2001. Chapter 1.

Mani et al "Independent Nearend Speech Detector for Echo Cancellation System" Manuscript received May 11, 2015; revised May 1, 2015; pp. 1-10.

* cited by examiner

NEAREND SPEECH DETECTOR

BACKGROUND OF THE INVENTION

This invention relates to a nearend speech detector and a method for classifying speech at a communication system.

In telephony, audio signals (e.g. including voice signals) are transmitted between a near-end and a far-end. Far-end signals which are received at the near-end may be outputted from a loudspeaker. A microphone at the near-end may be used to capture a near-end signal to be transmitted to the far-end. An "echo" occurs when at least some of the far-end signal outputted at the near-end is included in the microphone signal which is transmitted back to the far-end. In this sense the echo may be considered to be a reflection of the far-end signal.

An example scenario is illustrated in FIG. 1, which shows a signal being captured by a far-end microphone and output by a near-end loudspeaker. The echo is a consequence of acoustic coupling between the loudspeaker and a microphone at the near-end; the near-end microphone captures the signal originating from its own loudspeaker in addition to the voice of the near-end speaker and any near-end background noise. The result is an echo at the far-end loudspeaker. In Voice over IP (VoIP) communication systems, echoes can be especially noticeable due to the inherent delays introduced by the audio interfaces of VoIP communication devices.

In order to remove the unwanted echo from a microphone signal and recover the neared voice signal, an estimate of the echo may be formed and cancelled from the microphone signal. Such an estimate is typically synthesised at an adaptive echo estimation filter (AEEF) from the far-end voice signal. This arrangement is shown in FIG. 2 in which an AEEF 203 forms an estimate of the echo e from farend signal x, and the echo signal is then subtracted 204 from the microphone signal m so as to form an estimate of the true nearend signal d, from which the echo of the farend signal has been cancelled. The performance of such an echo cancellation arrangement depends on the adaptation control of the adaptive echo estimation filter (AEEF).

Under certain conditions it is necessary to freeze the coefficients of the AEEF or apply a negligible step size—for example, during presence of nearend signal in the microphone signal. Adapting the coefficients of the AEEF during presence of nearend signal is likely to lead to divergence of AEEF. A nearend speech detector (NSD) may be employed to detect the presence of nearend speech and its output used to decide when to freeze the coefficients of the AEEF and prevent their adaptation. This preserves echo path modelling and echo cancellation stability during the presence of nearend speech. A nearend speech detector may also detect the onset of double talk (and is sometimes referred to as a double talk detector, or DTD). This is because during double talk both nearend are farend speech is present, leading to the same divergence problem if the coefficients of the AEEF are permitted to adapt. A typical arrangement of a nearend speech detector 205 with respect to an AEEF is shown in FIG. 2.

Conventional algorithms for nearend speech detectors (NSD) use parameters of the AEEF itself to produce a binary signal used for either deciding whether the filter coefficients of the AEEF should be frozen or can be allowed to adapt, or determining a suitable step size for the filter (e.g. in accordance with an echo to nearend signal ratio). The performance of such algorithms thus depends on the performance of the AEEF. If the AEEF has not converged, the NSD may detect echo as nearend leading to a slow rate of convergence. On some of the platforms, the AEEF may never converge to its optimum set of coefficients due to platform non-linearity, low echo to noise ratio (ENR), etc. In such cases, the NSD may not work properly during the entire session of a voice call.

Various improvements on the conventional algorithms for nearend speech detectors have been proposed which do not depend on the parameters of an adaptive echo canceller. The Geigel DTD algorithm published by D. L. Duttweiler as "A twelve channel digital echo canceler", IEEE Transactions on Communications, 26(5):647-653, May 1978 has proven successful in line echo cancellers. However, it does not always provide reliable performance when used in echo cancellers under different ratios of echo signal to nearend signal. Methods based on cross-correlation have also been proposed, such as V. Das et al., "A new cross correlation based double talk detection algorithm for nonlinear acoustic echo cancellation", TENCON 2014 IEEE Region 10 Conference, pages 1-6, October 2014, as have methods based on coherence, such as T. Gansler et al., "A double-talk detector based on coherence", IEEE Transactions on Communications, 44(11):1421-1427, November 1996. However, these approaches suffer from poor performance under non-linearity and double talk.

Recently, blind source separation (BSS) techniques have been proposed to perform echo cancellation during the double-talk, such as Y. Sakai and M. T. Akhtar, "The performance of the acoustic echo cancellation using blind source separation to reduce double-talk interference", 2013 International Symposium on Intelligent Signal Processing and Communications Systems (ISPACS), pages 61-66, November 2013. Similarly, M. Kanadi et al., "A variable step-size-based ICA method for a fast and robust acoustic echo cancellation system without requiring double-talk detector, 2013 IEEE China Summit International Conference on Signal and Information Processing (ChinaSIP), pages 118-121, July 2013 proposes independent component analysis (ICA) for BSS to separate echo and nearend from the microphone signal. The separated echo is then applied to adapt the AEEF. Since these BSS methods are based on long block processing, they suffer from considerable delay in nearend speech detection and slow convergence speed. In addition, the use of techniques such as singular value decomposition (SVD) on the farend signal in order to detect periods of double-talk is computationally expensive and depends on the estimation error present in the EEF.

BRIEF SUMMARY OF THE INVENTION

According to a first aspect of the present invention there is provided a nearend speech detector for classifying speech at a communication system receiving a microphone signal from a nearend microphone and a farend signal from a farend communication system, the nearend speech detector comprising:
  a signal processor configured to transform the microphone and farend signals into the frequency domain;
  a calculation unit configured to form:
    an estimate of a nearend signal representing nearend speech present in the microphone signal; and
    a measure of gain between the microphone signal and the nearend signal;
  and a signal classifier configured to classify speech at the communication system in dependence on a measure of variance of the gain and a measure of variance of the nearend signal.

The calculation unit may be configured to form the estimate of the nearend signal and the measure of gain in respect of each of a plurality of frequency bins, and the measures of variance being measures of variance across the frequency bins.

The signal processor may be configured to transform the microphone and farend signals by performing Short Time Fourier Transform (STFT).

The microphone and farend signals formed at the signal processor may represent magnitude spectra of the microphone and farend signals in the frequency domain.

The microphone and farend signals may each represented as a sequence of frames and the nearend speech detector is configured to form an output classification in respect of each frame of the sequence.

The signal processor may be configured to further process the received microphone and farend signals by performing one or more of: synchronisation of the microphone and farend signals; scaling of the microphone and farend signals; and normalisation of the microphone and farend signals.

The signal processor or calculation unit may be configured to smooth the farend signal so as to preserve the magnitude spectrum of the farend signal up to the length of echo reverberation in the microphone signal.

The calculation unit may be configured to form the estimate of the nearend signal by operating a Wiener filter on the microphone signal in dependence on the farend signal.

The calculation unit may be configured to estimate, in respect of each frequency bin, a ratio of the microphone signal to the farend signal, the ratio of the microphone signal to the farend signal being used to form the measure of gain between the microphone signal and the nearend signal.

The calculation unit may be configured to estimate, in respect of each frequency bin, a ratio of the nearend signal to farend signal in dependence on the ratio of the microphone signal to the farend signal and a measure of gain formed for a preceding frame.

The ratio of the nearend signal to farend signal may include a component which is a half-wave rectified function of the ratio of the microphone signal to the farend signal.

The calculation unit may be configured to form the estimate of nearend signal in the microphone signal by applying the measure of gain to the microphone signal.

The calculation unit may be further configured to form, in respect of each frame, the measure of variance of the gain and the measure of variance of the nearend signal across the frequency bins.

The signal classifier may be configured to classify speech by comparing the measure of variance of the gain and the measure of variance of the nearend signal to respective thresholds, the output classification of the signal classifier being selected in dependence on whether said measures of variance lie above or below their respective thresholds.

The thresholds may be predefined for the measures of variance or adapted in dependence on characteristics of the microphone and/or farend signals.

The nearend speech detector may further comprise an energy calculator configured to determine, in respect of one or more frames of the microphone signal, a measure of frame energy, the signal classifier being configured to distinguish between doubletalk and silence in dependence on the measure of frame energy.

According to a second aspect of the present invention there is provided a system comprising:
  an adaptive echo estimation filter; and
  a nearend speech detector as claimed in any preceding claim;
  wherein the system is configured to freeze or substantially reduce the adaptive step size of the coefficients of the adaptive echo estimation filter in dependence on the output of the nearend speech detector.

According to a third aspect of the present invention there is provided a method for classifying speech at a communication system receiving a microphone signal from a nearend microphone and a farend signal from a farend communication system, the method comprising:
  transforming the microphone and farend signals into the frequency domain;
  estimating a nearend signal representing nearend speech present in the microphone signal;
  forming a measure of gain between the microphone signal and the nearend signal; and
  classifying speech at the communication system in dependence on a measure of variance of the gain and a measure of variance of the nearend signal.

The forming a measure of gain may comprise, in respect of each frequency bin:
  estimating a ratio of the microphone signal to the farend signal;
  estimating a ratio of the nearend signal to farend signal in dependence on the ratio of the microphone signal to the farend signal and a measure of gain formed for a preceding frame; and
  determining the measure of gain in dependence on the ratio of the nearend signal to farend signal.

The estimating a nearend signal may comprise, for each frequency bin, applying the measure of gain to the microphone signal.

The classifying speech at the communication system may comprise:
  comparing the measure of variance of the gain and the measure of variance of the nearend signal to respective thresholds; and
  selecting the output classification of the signal classifier in dependence on whether said measures of variance lie above or below their respective thresholds.

Computer program code may be provided defining the nearend speech detector, whereby the nearend speech detector is manufacturable. A non-transitory computer readable storage medium may be provided having stored thereon computer readable instructions that, when processed at a computer system for generating a manifestation of an integrated circuit, cause the computer system to generate a manifestation of the nearend speech detector.

Computer readable code may be provided for implementing the method for classifying speech at a communication system. A non-transitory computer readable storage medium may be provided having stored thereon computer readable instructions that, when processed at a processor, cause the processor to implement the method for classifying speech at a communication system.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable any person skilled in the art to make and use the invention. The present invention is not limited to the embodiments described herein and various modifications to the disclosed embodiments will be readily apparent to those skilled in the art.

There is provided a nearend speech detector (NSD) and a method for classifying speech at a communication system. A nearend speech detection as described herein may be used for classifying speech in any kind of communication system. Speech may be classified in any suitable manner, including, as one or more of nearend, echo/farend, double talk and silence. A nearend speech detector as described herein may be used to classify speech in any kind of communication system and for any purpose; a nearend speech detector does not require the presence of an echo canceller and the examples given herein of a nearend speech detector configured for use with an echo canceller are for illustrative purposes only. A nearend speech detector as described herein may be used, for example, to classify speech in a communication system for one or more of: any kind of echo canceller, including an echo canceller based on an adaptive echo estimation filter (AEEF); ERL estimation; and platform echo cancellation detection. In the examples described herein, the NSD is configured to operate on a stream of frames representing the microphone and farend signals. In other examples, an NSD may be configured to operate on signals which are not represented by a stream of frames.

Figure 1:
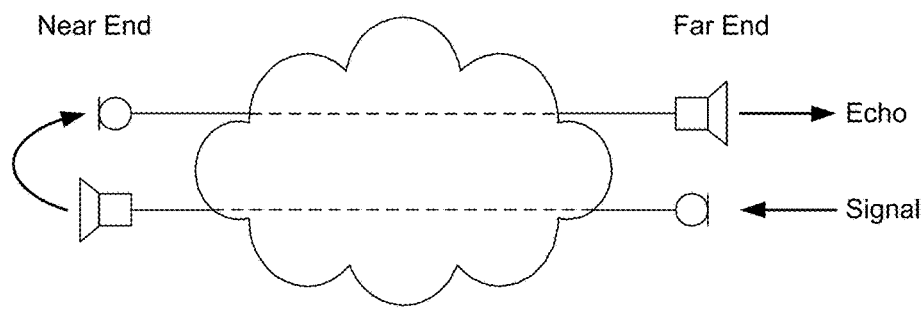
FIG. 1 shows an example of near-end and far-end in telephony.
Figure 2:
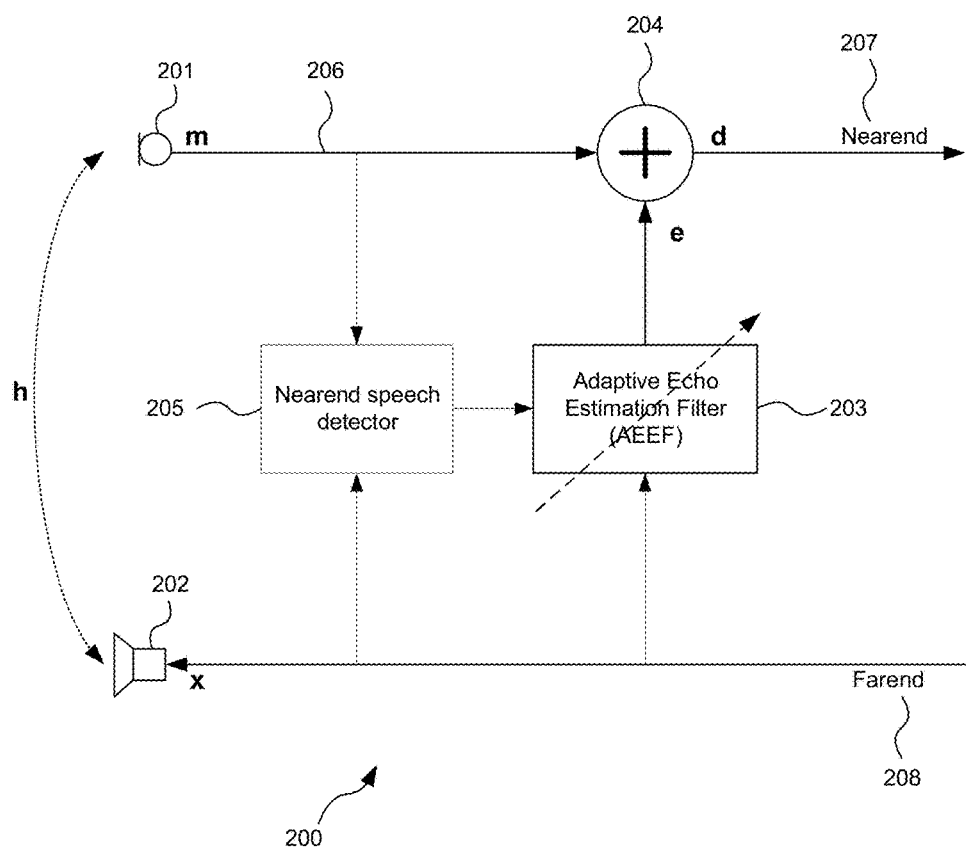
FIG. 2 is a schematic diagram of a nearend speech detector configured for use with an adaptive echo estimation filter.

A nearend speech detector for classifying speech is shown in FIG. 2 at an exemplary communication system 200 comprising a microphone 201, a speaker 202 and an adaptive echo estimation filter (AEEF) 203. In this example, communication system 200 is the nearend communication system and a farend signal is received from a farend communication system—the two communication systems could be, for example, smartphones or laptops running voice-over-IP (VoIP) software so as to allow users of the two systems to communicate with one another in the manner illustrated in FIG. 1.

The speaker 202 of the nearend communication system 200 outputs a farend signal 208 received from the farend communication system. A microphone 201 picks up neared speech by the user of the system, as well as background noise and echoes of the farend signal: together these components make up the microphone signal 206. As has been discussed, some of the farend signal will be received at the microphone 201 due to acoustic coupling between the speaker and microphone (e.g. by conduction through a housing of the system 200 into which the speaker and microphone are fixed, or due to acoustic reflections of the speaker output by surfaces in the locality of the system). The acoustic coupling is represented in FIG. 2 by the transfer function h.

In order to recover the nearend speech signal 207, an adaptive echo estimation filter 203 is provided to, based on the farend signal itself, generate an estimate of the echo of the farend signal present in the microphone signal. This estimated echo e may then be subtracted 204 from the microphone signal so as to form an estimate of the nearend signal 207. If AEEF 203 performs well and is converged, the estimated echo e will be close to the true echo received at the microphone 201 and nearend signal 207 will be a close representation of nearend speech.

As has been explained, under certain conditions it is necessary to freeze the coefficients of the AEEF or apply a negligible step size so as to avoid divergence of the AEEF. Nearend speech detector (NSD) 205 is provided to classify the speech conditions at the communication system so as to allow the communication system to appropriately control the adaptation of its AEEF 203. For example, in the arrangement shown in FIG. 2, NSD 250 provides an output to the AEEF 203 indicating the speech conditions at the communication system. The AEEF may determine when to freeze its coefficients in dependence on the NSD output. This is just one example. In other examples, the nearend speech detector 205 could process a microphone signal and a farend signal in order to form an indication of the speech condition at a communication system for any purpose.

The nearend speech detector 205 will now be described by way of example with respect to FIGS. 3 to 7.

Figure 3:
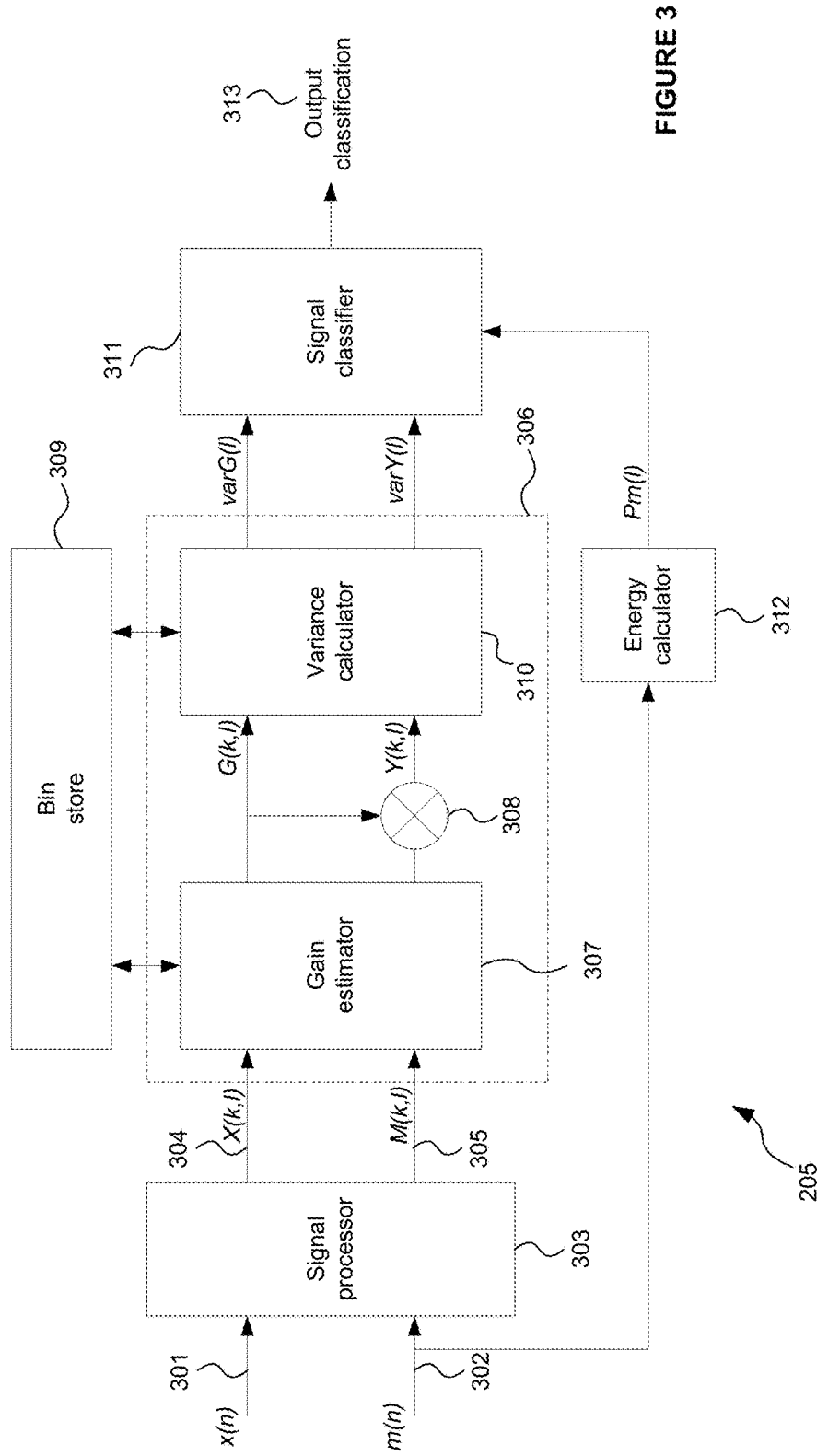
FIG. 3 is a schematic diagram of a nearend speech detector.

A schematic diagram of nearend speech detector (NSD) 205 is shown in FIG. 3. The NSD receives the farend signal x(n) 301 and the microphone signal m(n) 302. A signal processor 303 is configured to operate on the signals 301 and 302 to transform those signals into the frequency domain as converted farend signal X(k,l) 304 and converted microphone signal M(k,l) 305. For brevity the converted farend and microphone signals will simply be referred to as the farend and microphone signals. The signal processor may or may not form part of the NSD; in the example shown in FIG. 3 it is considered to form part of the NSD.

The NSD operates in the frequency domain on the farend and microphone signals 304 and 305. A calculation unit 306 of the NSD is configured to form parameters on the basis of which a signal classifier 311 determines the speech condition of the signals and provides an output classification indicating the result of that determination of the speech condition. The calculation unit may be configured to form an estimate of the nearend signal Y(k,l) and a measure of gain between the microphone signal and the estimate of the nearend signal. In accordance with the teaching provided herein, the calculation unit is configured to form measures of the variance of the estimate of a nearend signal and variance of the gain between the microphone signal and the estimate of the nearend signal. These measures of variance may be used at the signal classifier to distinguish between different speech conditions.

The operation of the calculation unit illustrated in FIG. 3 will now be described. The microphone signal m(n) includes the nearend speech signal d(n), background noise v(n), and an echo signal e(n) due to coupling of the farend signal into the microphone. Hence, the magnitude spectrum of microphone signal M(k,l) can be written in terms of the magnitude spectrum of the nearend signal D(k,l), the magnitude spectrum of the echo signal E(k,l) and the magnitude spectrum of the background noise signal V(k,l) as follows:

$$M(k,l)=D(k,l)+E(k,l)+V(k,l) \quad (1)$$

where k represents a frequency bin index (the frequency domain being discretely represented as a plurality of frequency bins) and l represents the frame index.

A gain estimator 307 of the calculation unit 306 is configured to filter the echo from the microphone signal so as to form an estimate of the nearend signal Y(k,l). This may be achieved by estimating, for each frequency bin, a measure of gain between the microphone and nearend signals. By applying such a gain to the value of the microphone magnitude spectrum in the respective frequency bin, a value describing the magnitude spectrum of the nearend signal in that frequency bin may then be formed.

A suitable gain function may be derived from a ratio of the microphone signal to farend signal (MFR) and an estimate of the ratio of the nearend signal to the farend signal (NFR). The MFR may be estimated in any suitable manner. It can be advantageous to smooth the farend signal. For example, a periodogram magnitude spectrum $\hat{X}(k,l)$ may be formed for the farend signal as follows:

$$\hat{X}(k,l)=\beta\hat{X}(k,l-1)+(1-\beta)X(k,l) \quad (2)$$

The smoothing factor β is preferably selected such that the periodogram estimate preserves the farend spectrum up to the length of echo reverberation in the microphone signal (as may be determined by any suitable means). Using the periodogram magnitude spectrum $\hat{X}(k,l)$ in place of the farend magnitude spectrum improves the stability of the NSD. The generation of the smoothed farend signal $\hat{X}(k,l)$ could be performed at the signal processor 303 or the calculation unit 306; in FIG. 3, the smoothed farend signal is formed at the gain estimator 307.

The MFR γ(k,l) is then estimated from $\hat{X}(k,l)$ and MR, as:

$$\gamma(k,l) = \frac{M(k,l)}{\hat{X}(k,l)} \quad (3)$$

The nearend signal is not available to the NSD 205, but by making certain assumptions as to the characteristics of the farend and nearend signals, an estimate of the NFR may be formed from the MFR. The assumptions are that:
1) Scaling the farend signal so as to form an estimate of the echo signal does not affect the ratio between the frequency components of the farend signal.
2) There exists a measure of gain G which, applied to the microphone signal frequency bins, filters echo from the microphone signal so as to yield the nearend signal.

Based on these assumptions, the ratio of the nearend signal to the farend signal, NFR may be estimated from the previous estimated frame of the nearend signal spectrally subtracted from M(k,l) and then half-wave rectified. During startup when the previous estimated frame is not available, a nearend estimate of zero may be used leading to an initial value for NFR of zero. This approach may suppress frequencies in the nearend signal that in the microphone M(k,l) and farend $\hat{X}(k,l)$ signals have considerable magnitude. The impact of farend scaling (e.g. at the signal processor 303 as discussed below) and spectral subtraction on the microphone signal is generally negligible for the purposes of forming an accurate and stable classification of the speech conditions. The NFR ξ(k,l) may be defined for each frequency bin k as, for example:

$$\xi(k,l)=\alpha G(k,l-1)\gamma(k,l-1)+(1-\alpha)\text{MAX}\{\gamma(k,l)-1,0\} \quad (4)$$

A higher value of NFR indicates that the level of echo in the microphone signal is low and the gain G is expected to be close to unity. Lower values of NFR indicate that the echo in the microphone signal is high and the gain G is expected to be near to zero for frequency bins that contain echo.

A suitable measure of the gain G between the microphone and nearend signals may be expressed as a Wiener function (5) of the estimated nearend to farend ratio, NFR:

$$G(k,l) = \frac{\xi(k,l)}{\xi(k,l)+1} \quad (5)$$

The gain function can be simplified in by assuming that speech characteristics vary slowly between frames such that G(k,l)≈G(k,l−1) and γ(k,l)≈γ(k,l−1).

Substituting the NFR expressed in equation (4) into gain function (5) and ignoring the indexes k and l for simplicity gives a simplified gain function:

$$G = \frac{\alpha G\gamma + (1-\alpha)(\gamma-1)}{1+\alpha G\gamma + (1-\alpha)(\gamma-1)} \quad (6)$$

This can be rewritten as the second order function:

$$G^2(\alpha\gamma)+G(1+(1-\alpha)(\gamma-1)-\alpha\gamma)+(1-\alpha)(\gamma-1)=0 \quad (7)$$

The solutions to this equation are $$\frac{\alpha-1}{\alpha} \text{ and } \frac{\gamma-1}{\gamma}.$$

Since α is a constant and the gain should be adaptive, $$\frac{\alpha-1}{\alpha}$$

is not a valid solution. Hence, the simplified gain function in terms of γ may be expressed as:

$$G = \frac{\gamma-1}{\gamma} = \frac{M-\hat{X}}{M} \quad (8)$$

It may be appreciated from equation (8) that when farend speech is absent or there is otherwise no echo in the microphone signal, G=1 and the variance of the gain magnitude spectrum will be equal to the variance of the magnitude spectrum of the microphone signal. Assuming the background noise V(k,l)=0, equation (8) can be further simplified using equation (1) above as follows:

$$G = \frac{(E+D)-\hat{X}}{E+D} \quad (9)$$

The echo magnitude spectrum E(k,l) may be modelled using a measure of the echo path impulse response H(k,l) (e.g. impulse response h shown in FIG. 2 transformed into the frequency domain) as HX. Since the scaled farend signal is expected to scatter all frequencies of the echo signal, the estimated gain formed in dependence on the previous estimated frame of the nearend signal spectrally subtracted from M(k,l) and then half-wave rectified may suppress the entirety of the echo signal present in the microphone signal. Hence, for echo only periods, it can be considered that E≈X̂. Since the nearend signal D=0 in echo only periods, then the gain G≈0 in echo only periods.

From the above assumptions, it will therefore be appreciated that the gain will be close to zero for frequency bins for which the magnitude spectrum of the farend signal is considerable and the gain will be close to 1 for the frequency bins for which the magnitude spectrum of the farend signal is negligible.

By applying the estimated gain G to the magnitude spectrum of microphone signal M(k,l), an estimate of the true nearend signal D(k,l) may be formed. The estimate of the nearend signal expressed as a magnitude spectrum is referred to as Y(k,l):

$$Y(k,l) = G(k,l)M(k,l) \quad (10)$$

The gain G(k,l) modifies the magnitude spectrum of the microphone signal so as to remove an estimate of the echo in the microphone signal and hence provide an estimate of the nearend signal. The gain may be operated on the microphone signal by multiplying the gain value of each frequency bin k by the magnitude of the microphone signal in that respective frequency bin. This is indicated by multiplier 308 in FIG. 3, which may or may not be considered to be part of the gain estimator.

A variance calculator 310 is configured to form measures of the variance of the gain G(k,l) and nearend signal estimate Y(k,l) across the frequency bins. Such measures of variance may be calculated in any suitable manner, including as a mathematical variance of each of the magnitude spectra, a rough measure of the variance of the values expressed for the frequency bins of each of the magnitude spectra, and as other measures of the spread of the values expressed for the frequency bins of each of the magnitude spectra (e.g. a measure of standard deviation). For example, a measure of the variance of Y(k,l) could be determined by the variance calculator according to:

$$\text{varY}(l) = \frac{1}{N-2}\sum_{k=1}^{N-1}\left(Y(k,l) - \frac{1}{N-2}\sum_{k=1}^{N-1}Y(k,l)\right)^2 \quad (11)$$

The variance varY(l) is close to zero for echo-only periods of the microphone signal, high during nearend speech (typically approximately equal to the variance of the magnitude spectrum of the microphone signal), and it typically has an intermediate but fluctuating value during double talk. The variance of the estimated nearend signal is useful for distinguishing between periods of echo and nearend speech.

Similarly, a measure of the variance of G(k,l) could be determined by the variance calculator according to:

$$\text{varG}(l) = \frac{1}{N-2}\sum_{k=1}^{N-1}\left(G(k,l) - \frac{1}{N-2}\sum_{k=1}^{N-1}G(k,l)\right)^2 \quad (12)$$

The variance varG(l) is close to zero for both nearend speech and echo-only periods of the microphone signal, but it may have considerable magnitude during double talk. The lack of correlation between the frequency bins of the microphone and farend signals can lead to significant gain fluctuation during double talk and the high variance of varG(l). As a result, the variance of the gain between the microphone and nearend signals is useful for identifying periods of double talk at communication system 200.

The NSD 205 may comprise a bin store 309 in which bin values for one or more of the farend signal X(k,l) or X̂(k,l), the microphone signal M(k,l) and the gain G(k,l). The bin store may hold data from more than one frame so as to be able to provide values from previous frames to, say, the gain estimator. The gain estimator 307 and/or variance calculator 310 may be configured to read from and/or write to the bin store. For example, the gain estimator may be configured to write values of X̂(k,l) to the bin store, and to read previous values of X̂(k,l) for previous frames from the bin store when it calculates the current bin values of X̂(k,l).

The gain and nearend estimate may have low values if both the farend and microphone signals substantially comprise silence or background noise. The stochastic nature of the low-level silence or background noise signals and the lack of correlation between microphone and farend signals can however lead to significant fluctuations in the variances of the gain and nearend estimate. In order to allow silence and doubletalk to be reliably distinguished, a measure of the frame energy of the microphone signal may also be used during decision making. An energy calculator 312 may be provided to determine a measure of the microphone frame energy. The NSD may or may not include the energy calculator; on some platforms a measure of the energy of each microphone may be available as a pre-calculated value (e.g. due to processing at the signal processor 303 or another unit of the system).

A measure of the energy in a frame of the microphone signal may be calculated in any suitable manner. For example, the microphone frame energy may be determined at the energy calculator 312 from the microphone signal in the time domain as:

$$Pm(l) = \frac{1}{L}\sum_{n=1}^{L} m^2(n) \quad (13)$$

where L is the length of the frame.

Signal classifier 311 is configured to distinguish between different speech conditions on the basis of the measures of variance of the gain and nearend signal, and optionally the microphone frame energy Pm(l). The output of the signal classifier is the output classification 313 which may be provided in any suitable form for use in the communication system or elsewhere. For example, the output classification may be a number between 0 and 3 indicating one of the four speech conditions echo, nearend, doubletalk and silence. The signal classifier may identify an echo-only condition when the variances of both the nearend estimate and the gain are low. The signal classifier may identify a nearend speech condition when the variance of the nearend estimate is high and the variance of the gain is low. The signal classifier may identify a doubletalk speech condition when the variances of both the nearend estimate and the gain are high.

The signal classifier may further check that the microphone frame energy is high in order to identify a speech condition as being doubletalk. When the microphone frame energy is low (and optionally neither of the nearend or gain variances are low), the signal classifier may identify silence (i.e. no farend or nearend speech) as the speech condition at the communication system. The particular values of the variances and frame energy which are considered high or low depends on the method selected to form the gain and nearend variances and the frame energy. An empirical approach may be adopted to identify suitable thresholds for each of the variances and frame energy above/below which the values of those parameters are considered to be high/low. In some implementations, the variances and frame energy may be normalised so as to each lie between 0 and 1.

Figure 5:
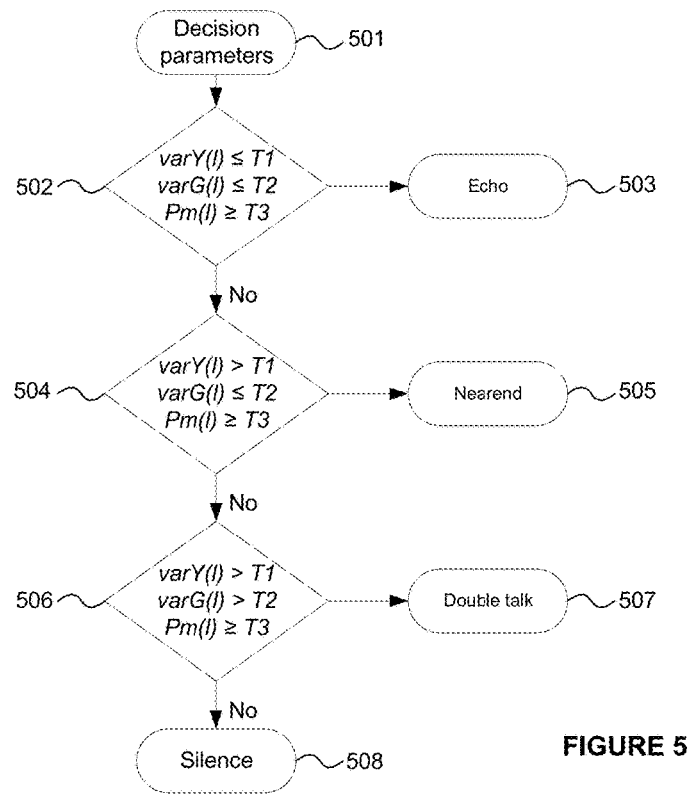
FIG. 5 is a flowchart illustrating the decision process performed by the signal classifier of FIG. 3.

A flowchart illustrating an exemplary set of steps performed by the signal classifier 311 in order to distinguish between different speech conditions at the communication system 200 is shown in FIG. 5. On receiving the decision parameters 501 (the nearend estimate variance, gain variance, and microphone frame energy), the signal classifier performs a series of checks 502, 504 and 506. Each check is performed against a set of thresholds T1, T2 and T3 for the nearend estimate variance, gain variance, and microphone frame energy, respectively. The thresholds may be predefined at the signal classifier, or could be adaptively determined in dependence on characteristics of the farend and microphone signals received at the communication system 200.

Check 502 verifies whether the nearend and gain variances are below their respective thresholds T1 and T2, and whether the frame energy is above its threshold T3: if the check is satisfied, the speech condition is output as echo-only 503. Check 504 verifies whether the nearend variance is above its respective threshold T1, whether the gain variance is below its respective threshold T2, and whether the frame energy is above its threshold T3: if the check is satisfied, the speech condition is output as nearend speech 505. Check 506 verifies whether the nearend variance is above its respective threshold T1, whether the gain variance is above its respective threshold T2, and whether the frame energy is above its threshold T3: if the check is satisfied, the speech condition is output as doubletalk 507. If none of the checks 502, 504 or 506 are satisfied, the signal classifier outputs the output classification as silence 508.

The nearend speech detector 205 described above with respect to FIGS. 2, 3 and 5 operates frame by frame on the microphone and farend signals in order to classify a frame period as echo, nearend speech, doubletalk or silence. A typical frame size may be around 10 ms.

It can be advantageous for the signal processor 303 to perform synchronisation between the farend and microphone signals so as to ensure that frames of the signals are synchronised with one another. This mitigates problems due to frame processing delays and delay on the echo path. It can further be advantageous for the signal processor 303 to scale the farend and/or microphone signals so as to compensate for the acoustic characteristics introduced by the echo path.

Figure 4:
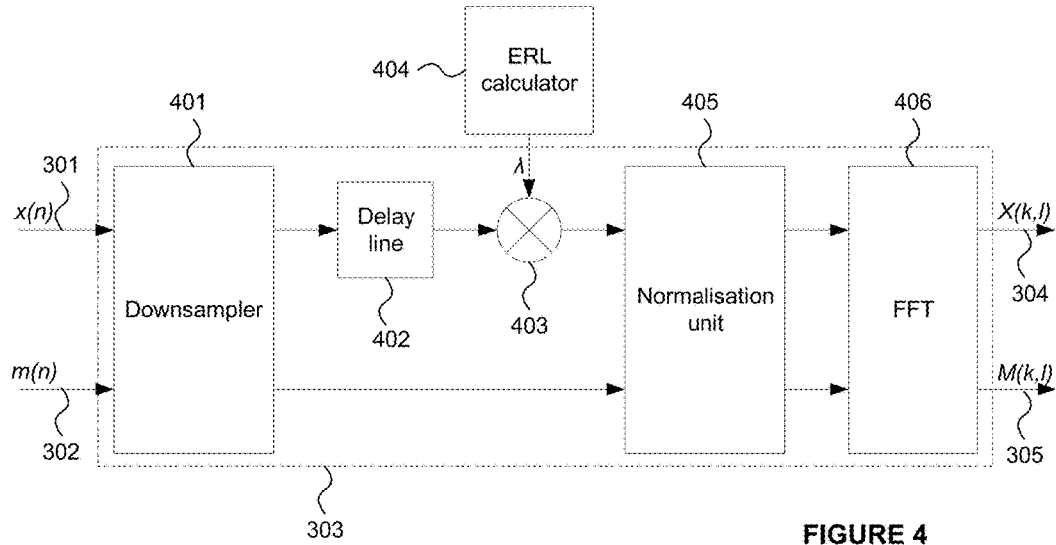
FIG. 4 is a schematic diagram of the signal processor shown in FIG. 3.

An exemplary embodiment of signal processor 303 is shown in FIG. 4. The signal processor operates on the farend 301 and microphone 302 time domain signals. In order to reduce the complexity of computations performed by the NSD, the signal processor may include a downsampler 401 configured to down-sample the farend and microphone signals. In general, the key frequency information in speech signals lies between 300 Hz and 3500 Hz, with the most important information being between 500 Hz and 2000 Hz. The downsampler 401 may be configured to down-sample the farend and microphone signals to around 4 kHz so as to maintain the key frequency information up to 2000 Hz and abandon the less important higher frequency components.

A delay line 402 may be added to the farend signal path so as to synchronise the farend signal with the microphone signal. An appropriate delay may be identified in any suitable manner, for example as described in US Patent Application 2013/0163698. The echo of the farend signal which is captured in the microphone signal will be coloured by the acoustic characteristics of the loudspeaker, the microphone and the audio interface of the communication system, as well as by artefacts caused by reflections and other phenomena on the farend signal path. The net effect of these colourations may be applied to the farend signal so as to estimate the echo present in the microphone signal due to the farend signal. In FIG. 3 this is achieved by multiplying the farend signal by a factor $\lambda$ at multiplier 403. The factor may be selected so as to scale the farend signal to a level appropriate for its echo in the microphone signal and/or introduce harmonics of the frequency components of the farend signal. A frequency-dependent scaling function may be formed in any suitable manner expressing the contribution of the farend signal to the microphone signal but an appropriate factor $\lambda$ can in fact be determined with minimal complexity from a measure of the echo return loss (ERL) formed, for example, at ERL calculator 404. For high positive ERL values (e.g. 12 dB), scaling of the farend signal to create an estimate of the echo signal can lead to echo dominating the nearend signal, the cancellation of nearend speech and possibly the classification of doubletalk as echo. For such high positive values of ERL a low scaling factor (e.g. 1) may be used. For low negative values of ERL (e.g. −12 dB), a high scaling factor (e.g. 4) may be used. The NSD may be initialised with a high scaling factor (e.g. 4). Using a scaling factor of greater than 1 can simulate the echo harmonics present in the farend signal by causing the microphone signal to saturate.

It can be advantageous to normalise the farend and microphone signals. This can help to minimise the complexity of the NSD. A normalisation unit 405 may be provided to perform such signal normalisation. This could be performed in dependence on a normalisation factor estimated from the microphone signal only but applied to both the microphone and farend signals by the normalization unit. The normalisation factor may be selected such that, when the normalisation factor is applied to the microphone signal, the power of the microphone signal is unity.

The signal processor transforms the (potentially downsampled, synchronised, scaled, and normalised) farend and microphone signals into the frequency domain at fast fourier transform (FFT) 406. The FFT 406 may be configured to perform this transformation using a Short Time Fourier Transform (STFT). The output of the signal processor is therefore a pair of frequency domain signals: farend signal $X(k,l)$ 304 and microphone signal $M(k,l)$ 305. These signals provide the inputs for the calculation unit 306 of the nearend speech detector 205.

Figure 6:
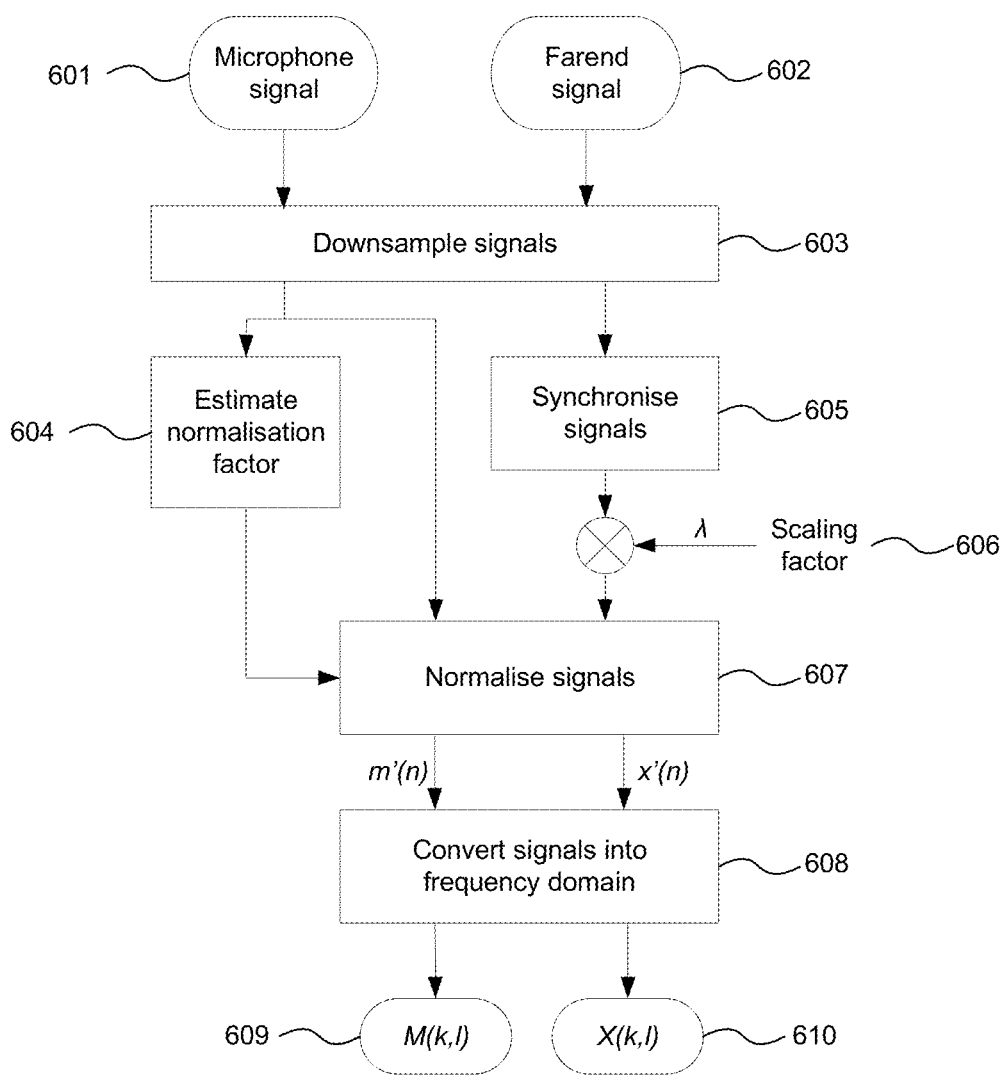
FIG. 6 is a flowchart illustrating the operation of the signal processor.
Figure 7:
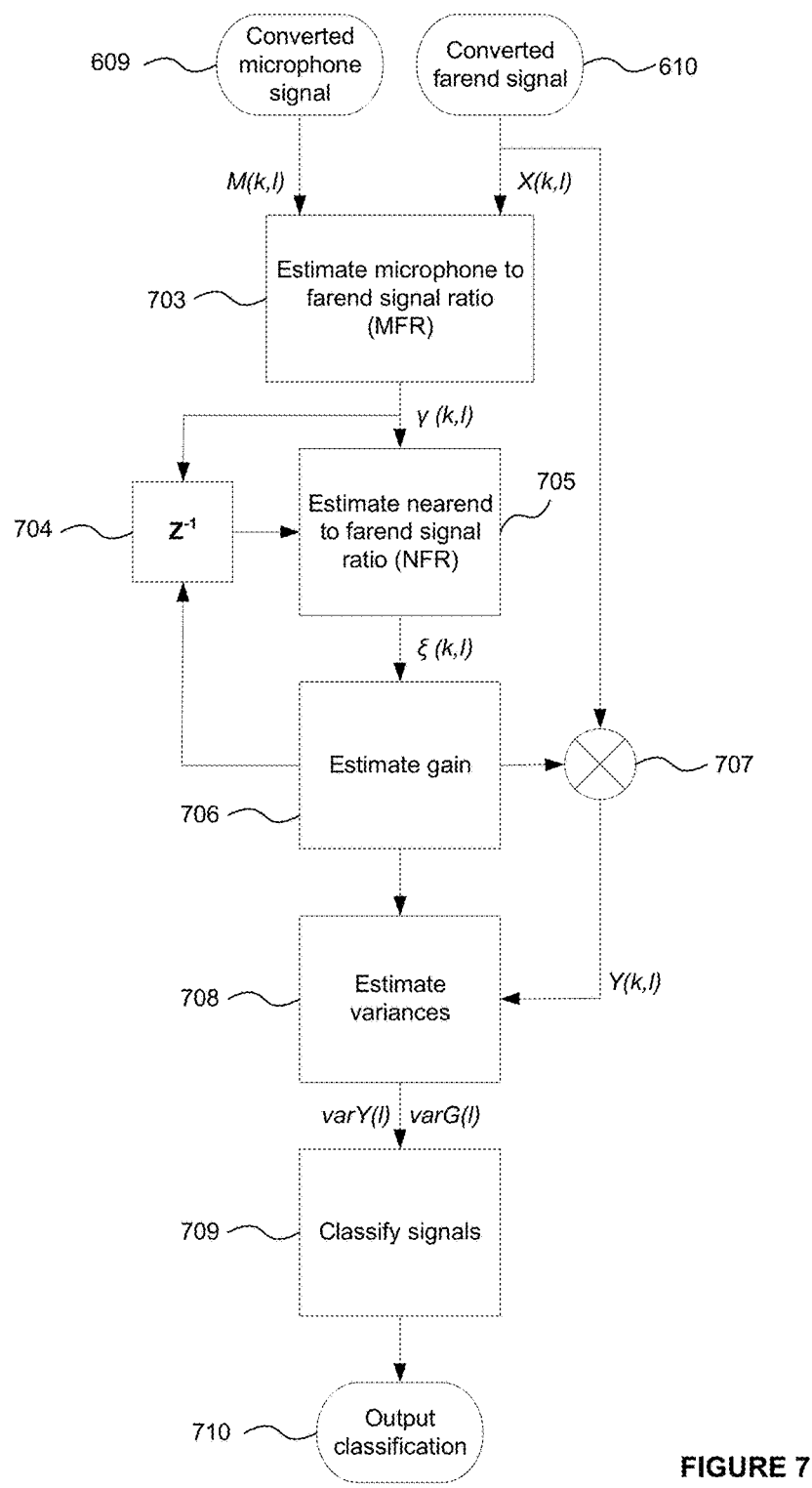
FIG. 7 is a flowchart illustrating the operation of the calculation unit of FIG. 3.

FIGS. 6 and 7 show flowcharts illustrating the operation of the signal processor and nearend signal detector, respectively, in accordance with the examples described herein. The signal processor operates on the microphone signal 601 from the microphone of the communication system and the farend signal 602 received from, for example, a farend communication system. Firstly, the signal processor downsamples the signals 603 to 4 kHz which is sufficient to preserve the key frequency components of speech. The downsampled microphone signal is used to estimate a normalisation factor 604. The downsampled farend signal is synchronised 605 with the downsampled microphone signal by, for example, inserting a suitable delay into the farend signal path. The farend signal is further scaled 606 by a scaling factor A so as to match the magnitude of the farend signal to the expected magnitude of the echo of the farend signal present in the microphone signal.

The downsampled microphone signal and downsampled, synchronised and scaled farend signal are then normalised 607 so as to generate time domain signals m'(n) and x'(n). The signal processor is then configured to convert these signals into the frequency domain 608 so as to form microphone signal M(k,l) 609 and farend signal X(k,l) 610.

FIG. 7 illustrates the operation of the NSD on the output of the signal processor. The NSD receives the converted microphone and farend signals and forms an estimate 703 of a microphone to farend signal ratio (MFR)—for example, in accordance with equation (3) above. The NSD then estimates 705 a nearend to farend signal ratio (NFR) from the microphone to farend signal ratio (MFR)—for example, in accordance with equation (4) above. This step may be performed in dependence on a measure of gain formed for the previous frame at step 706—in the figure the gain and MFR are subject to a single sample delay 704 such that the NFR is calculated based on the previous value of the gain and MFR. A measure of gain between the microphone and nearend signals is then calculated for the frame at 706—for example, in accordance with equation (5). An estimate of the nearend signal is formed from the farend signal 610 and estimated gain at multiplier 707—for example, in accordance with equation (10).

The variances of the gain and estimate of the neared signal are formed 708 and used to classify 709 the speech conditions at the communication system associated with the NSD. An output classification 710 is generated for use at the communication system, for example at an AEEF of the system so as to enable its coefficients to be frozen during nearend speech and/or doubletalk.

A nearend speech detector as described herein operates in frequency domain to classify microphone and farend signal frames. The NSD operates independently of an adaptive echo estimation filter (AEEF) and does not depend on the parameters of an AEEF. The NSD classifies speech at a communication system based on measures of the variance of the magnitude spectrum of an estimated nearend signal and the variance of the gain between the microphone signal and estimated nearend signal. Since the NSD works independently of an AEEF, the proposed NSD can be used for ERL estimation, platform AEC detection, etc. or any application requiring classification of speech at a communication system.

The NSD may implicitly or explicitly models the echo in a microphone signal so as to suppress the echo from the microphone signal and form an estimate of the nearend signal. When the estimated gain is close to optimum, it largely removes echo from the microphone signal. However, instead of being optimised for echo cancellation, the NSD may be optimised to generate parameters for speech classification.

Figure 8:
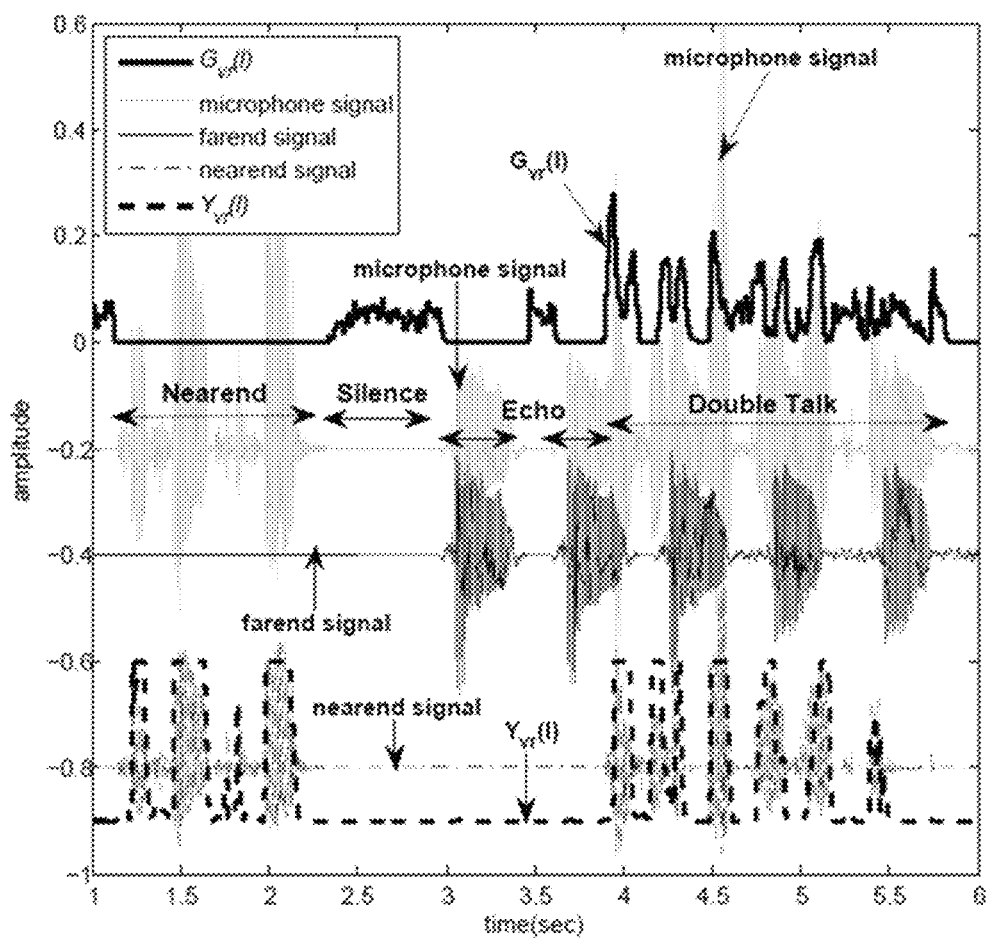
FIG. 8 is a plot illustrating the behaviour of the variances of the gain and estimated nearend signal with changes in the speech content of the microphone and farend signals.

FIG. 8 illustrates the variation of decision parameters varG(l) and varY(l) with variations in the microphone, farend and nearend signals. The test data illustrated in the figure starts with a period of nearend speech, followed by silence, an echo-only period, and then doubletalk. During the period of nearend speech (i.e. the nearend is active and the farend is inactive), the nearend variance varY(l) is significant but the gain variance varG(l) is low. During the period of silence, the nearend variance is low but the gain variance is fluctuating and of intermediate magnitude. During the echo-only period (i.e. the farend is active and the nearend is inactive), both the nearend and gain variances have low values. Since the gain and nearend variance parameters have different combinations during periods of nearend speech and echo-only, the gain and nearend variance parameters allow those speech conditions to be distinguished. During doubletalk periods (i.e. both nearend and farend are active), both the nearend variance and the gain variance are high. It is also possible for the nearend variance and gain variance to both have high values during periods of silence (i.e. no nearend or farend speech, but there could be background noise). A measure of microphone frame energy may be used to distinguish between doubletalk and silence.

Figure 9:
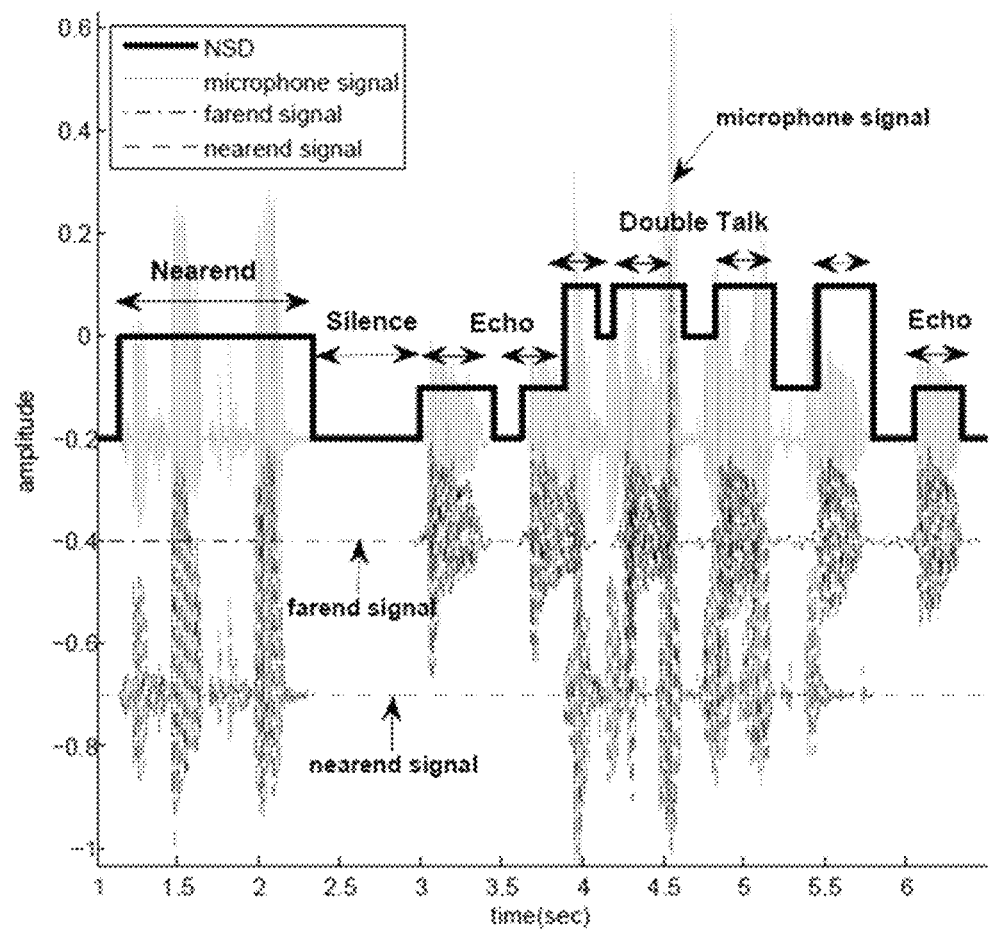
FIG. 9 is a plot illustrating the behaviour of the output of the nearend speech detector with changes in the speech content of the microphone and farend signals.

The output of the nearend signal detector 205 is illustrated in FIG. 9 for the test signal shown in FIG. 8. In this particular implementation of the NSD, the output of the NSD is arranged to be −0.2 for silence, −0.1 for echo-only, 0 for nearend speech, and 0.1 for doubletalk. In other implementations, the NSD outputs representing different speech conditions could be expressed in any manner. It can be observed from FIG. 9, that the NSD correctly identifies periods of nearend speech, silence, echo and doubletalk based on the nearend and gain variance parameters illustrated in FIG. 8. Furthermore, for a communication system with frames of length 10 ms it is possible to achieve detection of the onset of nearend speech within 10 ms (i.e. one frame) using an NSD described herein. The onset of termination of a period of nearend speech may be detected within 20 ms.

The test data illustrated in FIGS. 8 and 9 was generated in accordance with ITU-T Recommendation P.501, with the echo signal being generated using the room impulse response from ITU-T Recommendation P.340.

In many situations where the microphone signal contains significant signal energy that is independent of any echo this will be due to talking at the near-end. This situation is conveniently denoted "near-end speech" herein. The signal energy might, of course, be due to a different sound source. This is particularly true during teleconferencing or hands-free operation. Therefore, the term "near-end speech" is used to refer to any significant signal energy in the microphone signal that is not due to an echo.

The communication system, nearend speech detector and signal processor of FIGS. 2, 3 and 4, respectively, are shown as comprising a number of functional blocks. This is schematic only and is not intended to define a strict division between different logic elements or components. Each functional block may be provided in any suitable manner.

The terms software and program code as used herein includes executable code for processors (e.g. CPUs and/or GPUs), firmware, bytecode, programming language code such as C or OpenCL, and modules for reconfigurable logic devices such as FPGAs. Machine-readable code includes software/program code, as well as code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. Machine-readable code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A nearend speech detector for classifying speech at a communication system receiving a microphone signal from a nearend microphone and a farend signal from a farend communication system, the nearend speech detector comprising: a signal processor configured to transform the microphone and farend signals into the frequency domain; a calculation unit configured to form: an estimate of a nearend signal representing nearend speech present in the microphone signal; and a measure of gain between the microphone signal and the estimated nearend signal; and a signal classifier configured to classify speech at the communication system in dependence on a measure of variance of the gain and a measure of variance of the estimated nearend signal;
wherein the calculation unit is configured to form the estimate of the nearend signal and the measure of gain in respect of each of a plurality of frequency bins, and the measures of variance being measures of variance across the frequency bins.

2. A nearend speech detector as claimed in claim 1, wherein the signal processor is configured to transform the microphone and farend signals by performing Short Time Fourier Transform (STFT).

3. A nearend speech detector as claimed in claim 1, wherein the microphone and farend signals formed at the signal processor represent magnitude spectra of the microphone and farend signals in the frequency domain.

4. A nearend speech detector as claimed in claim 1, wherein the microphone and farend signals are each represented as a sequence of frames and the nearend speech detector is configured to form an output classification in respect of each frame of the sequence.

5. A nearend speech detector as claimed in claim 1, wherein the signal processor is configured to further process the received microphone and farend signals by performing one or more of: synchronisation of the microphone and farend signals; scaling of the microphone and farend signals; and normalisation of the microphone and farend signals.

6. A nearend speech detector as claimed in claim 1, wherein the signal processor or calculation unit is configured to smooth the farend signal so as to preserve the magnitude spectrum of the farend signal up to the length of echo reverberation in the microphone signal.

7. A nearend speech detector as claimed in claim 1, wherein the calculation unit is configured to form the estimate of the nearend signal by operating a Wiener filter on the microphone signal in dependence on the farend signal.

8. A nearend speech detector as claimed in claim 1, wherein the calculation unit is configured to estimate, in respect of each frequency bin, a ratio of the microphone signal to the farend signal, the ratio of the microphone signal to the farend signal being used to form the measure of gain between the microphone signal and the estimated nearend signal.

9. A nearend speech detector as claimed in claim 8, wherein the calculation unit is configured to estimate, in respect of each frequency bin, a ratio of the estimated nearend signal to farend signal in dependence on the ratio of the microphone signal to the farend signal and a measure of gain formed for a preceding frame.

10. A nearend speech detector as claimed in claim 9, wherein the ratio of the estimated nearend signal to farend signal includes a component which is a half-wave rectified function of the ratio of the microphone signal to the farend signal.

11. A nearend speech detector as claimed in claim 9, wherein the calculation unit is configured to form the estimate of nearend signal in the microphone signal by applying the measure of gain to the microphone signal.

12. A nearend speech detector as claimed in claim 1, wherein the calculation unit is further configured to form, in respect of each frame, the measure of variance of the gain and the measure of variance of the nearend signal across the frequency bins.

13. A nearend speech detector as claimed in claim 1, wherein the signal classifier is configured to classify speech by comparing the measure of variance of the gain and the measure of variance of the nearend signal to respective thresholds, the output classification of the signal classifier being selected in dependence on whether said measures of variance lie above or below their respective thresholds.

14. A nearend speech detector as claimed in claim 1, further comprising an energy calculator configured to determine, in respect of one or more frames of the microphone signal, a measure of frame energy, the signal classifier being configured to distinguish between doubletalk and silence in dependence on the measure of frame energy.

15. A system comprising: an adaptive echo estimation filter; and a nearend speech detector for classifying speech at a communication system receiving a microphone signal from a nearend microphone and a farend signal from a farend communication system, the nearend speech detector comprising: a signal processor configured to transform the microphone and farend signals into the frequency domain; a calculation unit configured to form: an estimate of a nearend signal representing nearend speech present in the microphone signal; and a measure of gain between the microphone signal and the estimated nearend signal; and a signal classifier configured to classify speech at the communication system in dependence on a measure of variance of the gain and a measure of variance of the estimated nearend signal;
wherein the system is configured to freeze or substantially reduce the adaptive step size of the coefficients of the adaptive echo estimation filter in dependence on the output of the nearend speech detector;
wherein the calculation unit is configured to form the estimate of the nearend signal and the measure of gain in respect of each of a plurality of frequency bins, and the measures of variance being measures of variance across the frequency bins.

16. A method for classifying speech at a communication system receiving a microphone signal from a nearend microphone and a farend signal from a farend communication system, the method comprising: transforming the microphone and farend signals into the frequency domain; estimating a nearend signal representing nearend speech present in the microphone signal; forming a measure of gain between the microphone signal and the estimated nearend signal; and classifying speech at the communication system in dependence on a measure of variance of the gain and a measure of variance of the estimated nearend signal;

wherein the forming step comprises a calculation unit configured to form the estimate of the nearend signal and the measure of gain in respect of each of a plurality of frequency bins, and the measures of variance being measures of variance across the frequency bins.

17. A method as claimed in claim 16, wherein the forming a measure of gain comprises, in respect of each frequency bin:

estimating a ratio of the microphone signal to the farend signal;

estimating a ratio of the nearend signal to farend signal in dependence on the ratio of the microphone signal to the farend signal and a measure of gain formed for a preceding frame; and determining the measure of gain in dependence on the ratio of the estimated nearend signal to farend signal.

18. A method as claimed in claim 16, wherein the classifying speech at the communication system comprises:

comparing the measure of variance of the gain and the measure of variance of the nearend signal to respective thresholds; and selecting the output classification of the signal classifier in dependence on whether said measures of variance lie above or below their respective thresholds.

19. A non-transitory computer readable storage medium having stored thereon computer readable instructions that, when executed at a processor, cause the processor to implement a method for classifying speech at a communication system receiving a microphone signal from a nearend microphone and a farend signal from a farend communication system, the method comprising: transforming the microphone and farend signals into the frequency domain; estimating a nearend signal representing nearend speech present in the microphone signal; forming a measure of gain between the microphone signal and the estimated nearend signal; and classifying speech at the communication system in dependence on a measure of variance of the gain and a measure of variance of the estimated nearend signal;

wherein the forming step comprises a calculation unit configured to form the estimate of the nearend signal and the measure of gain in respect of each of a plurality of frequency bins, and the measures of variance being measures of variance across the frequency bins.

* * * * *